US008841392B2

(12) United States Patent
Friederichs et al.

(10) Patent No.: US 8,841,392 B2
(45) Date of Patent: Sep. 23, 2014

(54) CATALYST SYSTEM AND A PROCESS FOR THE PRODUCTION OF POLYETHYLENE

(75) Inventors: Nicolaas Hendrika Friederichs, Geleen (NL); Raymond Gerlofsma, Geleen (NL)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/390,461

(22) PCT Filed: Aug. 13, 2010

(86) PCT No.: PCT/EP2010/004979
§ 371 (c)(1),
(2), (4) Date: Feb. 14, 2012

(87) PCT Pub. No.: WO2011/018237
PCT Pub. Date: Feb. 17, 2011

(65) Prior Publication Data
US 2012/0149857 A1 Jun. 14, 2012

(30) Foreign Application Priority Data
Aug. 14, 2009 (EP) ..................................... 09075364

(51) Int. Cl.
*C08F 10/00* (2006.01)
(52) U.S. Cl.
CPC ..................................... *C08F 10/00* (2013.01)
USPC ............................. 526/116; 502/113; 502/104
(58) Field of Classification Search
USPC ....................................................... 526/125.3
See application file for complete search history.

(56) References Cited

U.S. PATENT DOCUMENTS

| | | |
|---|---|---|
| 4,178,300 A | 12/1979 | van den Berg |
| 4,218,339 A | 8/1980 | Zucchini et al. |
| 4,226,964 A | 10/1980 | Tanaka et al. |
| 4,305,840 A | 12/1981 | Zucchini et al. |
| 4,472,521 A | 9/1984 | Band |
| 4,525,554 A | 6/1985 | Tanaka et al. |
| 4,814,314 A | 3/1989 | Matsuura et al. |
| 4,904,630 A | 2/1990 | Matsuura et al. |
| 4,962,167 A | 10/1990 | Shiraishi et al. |
| 5,122,494 A | 6/1992 | Job |
| 5,124,298 A | 6/1992 | Job |
| 5,371,157 A | 12/1994 | Job |
| 5,587,440 A | 12/1996 | Ehlers et al. |
| 5,693,719 A | 12/1997 | Goto et al. |
| 6,114,271 A | 9/2000 | Bilda et al. |
| 6,204,349 B1 | 3/2001 | Shinohara et al. |
| 6,294,682 B1 | 9/2001 | Rauleder et al. |
| 6,511,935 B2 | 1/2003 | Job |
| 6,559,249 B2 | 5/2003 | Yang et al. |
| 7,160,453 B1 | 1/2007 | Matsumura et al. |
| 2002/0016255 A1* | 2/2002 | Job .............................. 502/113 |
| 2005/0124488 A1 | 6/2005 | Kong et al. |
| 2007/0062862 A1 | 3/2007 | Hughes et al. |
| 2007/0225390 A1 | 9/2007 | Wang et al. |
| 2007/0299224 A1 | 12/2007 | Vizzini et al. |
| 2009/0163679 A1 | 6/2009 | Do Nascimento et al. |

FOREIGN PATENT DOCUMENTS

| | | |
|---|---|---|
| AU | 622026 B2 | 11/1990 |
| CA | 2100143 A1 | 4/1994 |
| CN | 101074275 A | 11/2007 |
| EP | 0086481 A1 | 8/1983 |
| EP | 0087100 A1 | 8/1983 |
| EP | 0317200 A1 | 5/1989 |
| EP | 0349146 A2 | 1/1990 |
| EP | 0350339 A2 | 1/1990 |
| EP | 0398167 A2 | 11/1990 |
| EP | 0523785 A2 | 1/1993 |
| EP | 0574153 A1 | 12/1993 |
| EP | 0594190 A1 | 4/1994 |
| EP | 0717055 A2 | 6/1996 |
| EP | 0876318 B1 | 8/2000 |
| EP | 1661917 A1 | 5/2006 |
| JP | 61047712 A | 3/1986 |
| JP | 04285606 A | 10/1992 |
| JP | 05301921 A | 11/1993 |
| JP | 07196861 A | 8/1995 |
| JP | 0873388 | 3/1996 |
| WO | 0100692 A1 | 1/2001 |

OTHER PUBLICATIONS

Japanese Patent No. 07196861 (A); Publication Date: Aug. 1, 1995; Machine Translation; 13 Pages.
Japanese Patent No. 61047712 (A); Publication Date: Mar. 8, 1986; Abstract Only; 1 Page.
Berzen et al.; "Ultrahigh Molecular Weight Polyethylene (UHMW-PE): Application in Artificial Joints"; The British Polymer Journal; vol. 10; Dec. 1978; pp. 281-287.

(Continued)

*Primary Examiner* — Ling Choi
*Assistant Examiner* — Catherine S Branch
(74) *Attorney, Agent, or Firm* — Cantor Colburn LLP

(57) ABSTRACT

The invention relates to a catalyst system comprising I. a solid reaction product obtained by reaction of: (a) a hydrocarbon solution comprising (1) an organic oxygen containing magnesium compound (2) an organic oxygen containing titanium compound and (3) at least one compound containing zirconium and/or hafnium (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0<n<3$ and a silicon compound of formula $R_mSiCl_{4-m}$ wherein $0<m\leq2$ and R is a hydrocarbon radical containing 1-10 carbon atoms wherein the molar ratio of metal from (b): titanium from (a) is lower than 1:1 and II. an organo aluminum compound having the formula $AlR_3$ in which R is a hydrocarbon radical containing 1-10 carbon atoms. The catalyst is applied during the polymerization of ethylene, preferably ultra high molecular weight polyethylene.

11 Claims, No Drawings

(56) References Cited

OTHER PUBLICATIONS

Ciardelli et al.; "Active Sites Nature and Behavior in Supported Bimetallic (Titanium & Hafnium) Catalysts for Olefin Polymerization"; Memorias—Simposio Latinoamericano de Polimeros; 3rd Volume; Document No. XP009060181; 1992; 11 Pages.

Dall'Occo et al.; "Transition Metals and Organometallics as Catalysts for Olefin Polymerization"; Springer-Verlag Berlin Heidelberg; 1988; pp. 209-222.

Extended European Search Report; European Application No. 09075364.1; Date of Mailing: Jun. 22, 2010; 7 Pages.

Kelly; "Ultra-High Molecular Weight Polyethylene"; Journal of Macromolecular Science: Part C—Polymer Reviews; vol. C42, No. 3; 2002; pp. 355-371.

Masi et al.; "The Role of Hafnium in Supported Titanium/Hafnium Catalysts for Olefin Polymerization"; Macromolecular Chemistry and Physics; vol. 15, Issue Supplement 15; Jun. 1989; pp. 147-165.

Partial European Search Report; European Application No. 09075364.1; Date of Mailing: Mar. 24, 2010; 5 Pages.

International Search Report; International Application No. PCT/EP2010/004979; International Filing Date: Aug. 13, 2010; Date of Mailing: Jun. 27, 2011; 6 Pages.

Written Opinion of the International Searching Authority; International Application No. PCT/EP2010/004979; International Filing Date: Aug. 13, 2010; Date of Mailing: Jun. 27, 2011; 10 Pages.

Stein; "Ultra High Molecular Weight Polyethylene (UHMWPE)"; Engineered Materials Handbook; vol. 2: Engineering Plastics; ASM International; 1999; pp. 167-171.

Japanese Patent No. 05301921 (A); Publication Date: Nov. 16, 1993; Machine Translation; 6 Pages.

European Patent No. 0876318; Date of Publication: Nov. 11, 1998; Abstract Only; 1 page.

Chinese Patent No. 101074275 (A); Publication No. Nov. 21, 2007; Abstract Only; 1 Page.

Japanese Patent No. 4285606(A); Publication Date: Oct. 9, 1992; Abstract Only; 1 Page.

Bromstrup, Heiner; "PE 100 Pipe Systems"; 2nd Edition; Published: May 1, 2007; 5 Pages.

English Abstract of JP08073388; Date of Publication Mar. 19, 1996; 6 pages.

\* cited by examiner

CATALYST SYSTEM AND A PROCESS FOR THE PRODUCTION OF POLYETHYLENE

CROSS REFERENCE TO RELATED APPLICATIONS

This application is a 371 of International Application No. PCT/EP2010/004979, filed Aug. 13, 2010, which claims priority to European Application No. 09075364.1, filed Aug. 14, 2009, both of which are hereby incorporated by reference in its entirety.

TECHNICAL FIELD

The present invention relates to a catalyst system and to a process for the production of polyethylene in the presence of this catalyst system.

BACKGROUND

The catalytic production of polyethylene is very well known in the art. A very special class of polyethylene is ultra high molecular weight polyethylene (UHMWPE) with a very high average molecular weight ranging from about 1000000 to well above 6000000 grams/mole whereas high density polyethylene (HDPE) typically has a molar mass between about 50000 and 300000 g/mol. Therefore, these linear polymers have an average molecular weight much higher than that of linear high density polyethylene. The polymer synthesis to obtain UHMWPE is disclosed in Journal of Macromolecular Science Part C Polymer Reviews, Vol. C42, No 3, pp 355-371, 2002. The higher molecular weight gives UHMWPE the unique combination of characteristics making it suitable for applications where lower molecular weight grades fail. The very high molecular weight of this polyethylene results in excellent properties for example a very high abrasion resistance, a very high impact resistance, a very high melt viscosity and a low dynamic coefficient of friction. Because of the high molecular weight and the high melt viscosity specialized processing methods like compression moulding and ram extrusion are applied. Due to the high molecular weight, UHMWPE displays bad flow ability when molten, it is difficult to mould it into a pellet form and the product has to be delivered in a powder form and even more important, it has also to be processed from powder. Consequently, the powder properties heavily determine the production process as well as the converting process. For example, this powder has to be stored and to be transported, and consequently the bulk density of the UHMWPE powder is very important. A higher bulk density may decrease clogging at its transportation and it is possible to increase a storable amount per unit volume. By increasing the bulk density, the weight of the UHMWPE per unit volume present in a polymerization vessel can be increased and the concentration of the UHMWPE powder in the polymerization vessel can be enhanced. Similarly in the processing of UHMWPE a high bulk density also is required. As mentioned, typical processing procedures are ram extrusion and compression moulding. Both methods in principle involve sintering of the powder particles (Stein in Engineered Materials Handbook, Volume 2: Engineering Plastics, ASM International 1999 page 167-171). In order for this sintering to become effective, it is very important that a dense polymer powder packing is achieved, which translates into a high bulk density. The bulk density of UHMWPE should be above 300 kg/m$^3$ and even more preferably above 350 kg/m$^3$. Furthermore the average particle size of the UHMWPE powder is an important characteristic. The average particle size ($D_{50}$) is preferably lower than 250 micrometers, more preferably below 200 micrometers. In addition, the particle size distribution, commonly known as the "span", defined as ($D_{90}-D_{10}$)/$D_{50}$, should be low, preferably below 2, and even more preferably below 1.5.

The shape of the polymer powder particles is translated from the shape of the catalyst particles, also known as the replica phenomenon. In general, when this replication takes place, the average particle size of the polymer is proportional to the cube root of the catalyst yield, i.e. the grams of polymer produced per gram of catalyst. See for example Dall'Occo et al, in "Transition Metals and Organometallics as Catalysts for Olefin Polymerization" (Kaminsky, W.; Sinn, H., Eds.) Springer, 1988, page 209-222. Due to this proportionality, small polymer particles may be produced by reducing the catalyst yield, but this causes high catalyst residues in the polymer and also high catalyst costs needed to produce the polymer. This puts severe requirements on the catalyst because a high catalyst activity is required combined with a polymer particle size below 250 μm, preferably below 200 μnm.

The catalyst must be able to produce UHMWPE with sufficiently high molar mass in an economic efficient way. In processes to produce polyolefin the removal of the heat of polymerization is crucial and consequently the polymerization is carried out at increased temperatures to maximize reactor output per time and to reduce energy costs related to heat removal. Therefore it is desirable to apply a polymerization temperature as high as possible. However at increased polymerization temperatures the Ziegler catalysts tend to produce lower molar mass polymers. So the highest possible temperature that can be applied is affected by the highest molar mass that a certain Ziegler catalyst can produce. So there is a need for catalysts that are able to produce very high molar mass polyethylene at elevated polymerization temperature.

SUMMARY

It is the object of the present invention to provide a catalyst which results in a UHMWPE displaying a high molar mass, a high powder bulk density, a narrow span and an average particle size below 250 μm and furthermore shows a high catalyst activity.

DETAILED DESCRIPTION

The catalyst according to the invention is characterised in that the catalyst system comprises I. the solid reaction product obtained by reaction of:
(a) a hydrocarbon solution comprising
  (1) an organic oxygen containing magnesium compound
  (2) an organic oxygen containing titanium compound and
  (3) at least one compound containing zirconium and/or hafnium and
(b) a mixture comprising a metal compound having the formula MeR$_n$X$_{3-n}$ in which X is a halogenide, Me is a metal of Group III of Mendeleev's Periodic System of Chemical Elements, R is a hydrocarbon radical containing 1-10 carbon atoms and 0≤n<3 and a silicon compound of formula R$_m$SiCl$_{4-m}$ wherein 0≤m≤2 and R is a hydrocarbon radical containing 1-10 carbon atoms wherein the molar ratio of metal from (b): titanium from (a) is lower than 1:1 and II. an organo aluminum compound having the formula AlR$_3$ in which R is a hydrocarbon radical containing 1-10 carbon atoms.

Preferred metals of Group III of Mendeleev's Periodic System of Chemical Elements are aluminum and boron.

Preferably the halogenide is Cl.

The combination of the hydrocarbon solution comprising the organic oxygen containing magnesium compound, the organic oxygen containing titanium compound and the compound containing zirconium and/or hafnium and the specific mixture comprising the metal compound and the silicon compound results in a catalyst which provides a UHMWPE displaying a high molar mass, a high powder bulk density, a narrow span and an average particle size below 250 µm and furthermore shows a high catalyst activity.

It is essential that the components of the mixture (b) are used as a mixture in the reaction with the hydrocarbon solution (a) instead of being used separately or sequentially.

According to a preferred embodiment of the invention the compound containing zirconium and/or hafnium is selected from the group of organic oxygen containing zirconium and/or hafnium compounds.

According to a preferred embodiment of the invention the metal compound from (b) having the formula $MeR_nX_{3-n}$ is an aluminum compound having the formula $AlR_nX_{3-n}$ in which X is a halogen and R is hydrocarbon radical containing 1-10 carbon atoms and $0 \leq n < 3$.

Preferably the molar ratio of aluminum from (b): titanium from (a) is lower than 1:1.

According to a preferred embodiment of the invention, the molar ratio of titanium from 1(a) (2) to the organic oxygen containing compound from 1(a) (3) is in the range between 1:20 to 10:1.

According to a further preferred embodiment of the invention the catalyst system comprises I. the solid reaction product obtained by reaction of:
(a) a hydrocarbon solution comprising
(1) an organic oxygen containing magnesium compound
(2) an organic oxygen containing titanium compound and
(3) at least one compound containing zirconium and/or hafnium and
(b) a mixture comprising a metal compound having the formula $MeR_nX_{3-n}$ wherein X is a halogen and R is a hydrocarbon radical containing 1-10 carbon atoms and $0 \leq n < 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower than 1:1.
and
(c) post treatment of the obtained solid reaction product with an aluminum compound having the formula $AlR_nCl_{3-n}$ wherein R is a hydrocarbon radical containing 1-10 carbon atoms and $0 \leq n < 3$ and
II. an organo aluminum compound having the formula $AlR_3$ in which R is a hydrocarbon radical containing 1-10 carbon atoms.

This catalyst results in a polymer having a high powder bulk density, a narrow span and an average particle size below 250 micrometers. Furthermore the catalyst has a high catalyst activity.

The organic oxygen containing magnesium compound does not comprise a magnesium-carbon bond.

Suitable organic oxygen containing magnesium compounds include for example alkoxides such as magnesium methylate, magnesium ethylate and magnesium isopropylate and alkylalkoxides, for example magnesium ethylethylate.

Preferably the organic oxygen containing magnesium compound is a magnesium alkoxide.

According to a further preferred embodiment of the invention the magnesium alkoxide is magnesium ethoxide.

Suitable organic oxygen containing titanium compounds and the zirconium or hafnium containing compounds may be represented by the general formula $[MtO_x(OR)_{4-2x}]_n$ in which Mt is selected from the group of titanium, zirconium and hafnium and R represents an organic radical, x ranges between 0 and 1 and n ranges between 1 and 6.

Suitable examples of organic oxygen containing titanium compounds with the formula $[TiO_x(OR)_{4-2x}]_n$, zirconium compounds with the formula $[ZrO_x(OR)_{4-2x}]_n$ and hafnium compounds with the formula $[HfO_x(OR)_{4-2x}]_n$ include alkoxides, phenoxides, oxyalkoxides, condensed alkoxides, carboxylates and enolates.

Suitable zirconium and hafnium containing compounds include mixed alkoxymetalchlorides with the formula $(OR)_yZrCl_{4-y}$ and $(OR)_yHfCl_{4-y}$ wherein $1 \leq y \leq 3$.

According to a preferred embodiment of the invention the organic oxygen containing titanium compound is titanium alkoxide.

According to a preferred embodiment of the invention the organic oxygen containing zirconium compound is zirconium alkoxide.

According to a preferred embodiment of the invention the organic oxygen containing hafnium compound is hafnium alkoxide.

Suitable alkoxides include for example $Ti(OC_2H_5)_4$, $Ti(OC_3H_7)_4$, $Ti(OC_4H_9)_4$, $Ti(OC_8H_{17})_4$, $Zr(OC_3H_7)_4$, $Zr(OC_4H_9)_4$, $Zr(OC_8H_{17})_4$, $Hf(OC_3H_7)_4$, $Hf(OC_4H_9)_4$ and $Hf(OC_8H_{17})_4$.

According to a further preferred embodiment of the invention the titanium alkoxide is $Ti(OC_4H_9)_4$.

According to a preferred embodiment the metal compound having the formula $MeR_nX_{3-n}$ is an aluminum compound having the formula $AlR_nX_{3-n}$.

Suitable examples of aluminum compounds having the formula $AlR_nX_{3-n}$ include aluminum tri chloride, ethyl aluminum dibromide, ethyl aluminum dichloride, propyl aluminum dichloride, n-butyl aluminum dichloride, isobutyl aluminum dichloride, diethyl aluminum chloride, diisobutyl aluminum chloride, triisobutyl aluminum and tri-n-hexyl aluminum.

According to a preferred embodiment the organo aluminum halogenide in the mixture of I (b) is an organo aluminum chloride and more preferably ethyl aluminum dichloride.

Suitable examples of organo aluminum compound of the formula $AlR_3$ include for example triethyl aluminum, triisobutyl aluminum, tri-n-hexyl aluminum and tri octyl aluminum.

The hydrocarbon solution of organic oxygen containing magnesium compound and organic oxygen containing titanium, zirconium and hafnium compounds can be prepared according to procedures as disclosed for example in U.S. Pat. No. 4,178,300 and EP-A-876318. The solutions are in general clear liquids. In case there are any solid particles, these can be removed via filtration prior to the use of the solution in the catalyst synthesis.

Generally the hydrocarbon is a $C_4$-$C_{12}$ saturated hydrocarbon. Preferably, the hydrocarbon is a $C_5$-$C_7$ saturated hydrocarbon.

Although aluminum compounds, specifically aluminum alkyl chlorides, are frequently used in the preparation of catalysts for polyolefins, it has surprisingly been found that the amount of aluminum compound in (b) should be unexpectedly low, typically below a molar ratio of aluminum from (b) to titanium from (a) of less then 1.

According to the preferred embodiment of the invention the molar ratio of aluminum from (b): titanium from (a) is lower than 1:1.

Preferably this ratio is lower than 0.8:1 and more preferably this ratio is lower than 0.6:1.

According to a preferred embodiment of the invention the molar ratio of chlorine from $R_mSiCl_{4-m}$: oxygen being present in the hydrocarbon solution (a) is lower than 3:1 and more preferably lower than 2:1.

In a preferred embodiment the molar ratio of magnesium: titanium is lower than 3:1.

Preferably the molar ratio magnesium: titanium ranges between 0.2:1 and 3:1.

Generally the molar ratio Al from the aluminum compound in (b+c): Ti ranges between 0.05:1 and 1:1.

According to a preferred embodiment of the invention the molar ratio Al from the aluminum compound in (b+c):Ti ranges between 0.05:1 and 0.8:1.

Generally the average particle size of the catalyst ranges between 3 μm and 30 μm. Preferably this average particle size ranges between 3 μm and 10 μm.

Generally the span of the particle size distribution is lower than 3.

The catalyst of the present invention may be obtained by a first reaction between an organic oxygen containing magnesium compound, an organic oxygen containing titanium compound and an organic oxygen containing hafnium and/or zirconium compound, followed by dilution with a hydrocarbon solvent, resulting in a soluble complex after which a reaction between a hydrocarbon solution of said complex and the mixture comprising the metal compound having the formula $MeR_nX_{3-n}$ and the silicon compound of formula $R_mSiCl_{4-m}$ takes place.

According to a preferred embodiment of the invention the catalyst is obtained by a first reaction between a magnesium alkoxide, a titanium alkoxide and a zirconium alkoxide and/or hafnium alkoxide, followed by dilution with a hydrocarbon solvent, resulting in a soluble complex consisting of a mixed alkoxide containing magnesium, titanium and zirconium and/or hafnium and after which a reaction between a hydrocarbon solution of said complex and the mixture comprising the aluminum compound having the formula $AlR_nX_{3-n}$ and the silicon compound of formula $R_mSiCl_{4-m}$ takes place.

The mixture comprising the aluminum compound having the formula
$AlR_nX_{3-n}$ and the silicon compound of formula $R_mSiCl_{4-m}$ is preferably used as a solution in a hydrocarbon.

A subsequent post treatment step in the presence of an aluminum alkyl or aluminum alkyl halogenide is possible.

The sequence of the addition can be either adding the hydrocarbon solution containing the organic oxygen containing magnesium compound and organic oxygen containing titanium compound to the mixture comprising the aluminum compound having the formula $AlR_nX_{3-n}$ and the silicon compound of formula $R_mSiCl_{4-m}$ or the reversed.

Preferably the hydrocarbon solution containing the organic oxygen containing magnesium compound and organic oxygen containing titanium compound is dosed to a stirred hydrocarbon solution comprising the aluminum compound having the formula $AlR_nX_{3-n}$ and the silicon compound of formula $R_mSiCl_{4-m}$.

The temperature for this reaction can be any temperature below the boiling point of the used hydrocarbon. It is however beneficial to use temperatures below 60° C., preferably below 50° C. Generally the duration of the addition is preferably longer than 10 minutes and preferably longer than 30 minutes.

In the reaction of the hydrocarbon solution comprising the magnesium compound, preferably the organic oxygen containing magnesium compound, and the organic oxygen containing titanium, zirconium or hafnium compound with the mixture of the halogen containing silicon compound and the aluminum compound, a solid precipitates and after the precipitation reaction the resulting mixture is heated to finish the reaction. After the reaction the precipitate is filtered and washed with a hydrocarbon. Other means of separation of the solids from the diluent and subsequent washings can also be applied, like for example multiple decantation steps. All steps should be performed in an inert atmosphere of nitrogen or another suitable inert gas. The post treatment with an aluminum compound can be performed either before the filtration and washing steps or after this procedure.

An advantage of the catalyst according to the invention is that the productivity of the catalysts is high and consequently the catalyst residues in the polymer are very low. An additional advantage of the catalyst is that the synthesis to produce the catalyst is relatively simple and cheap based on readily available and relatively easy to handle compounds.

According to another embodiment of the invention the catalyst system comprises
I. the solid reaction product obtained by reaction of:
(a) a hydrocarbon solution comprising
(1) an organic oxygen containing magnesium compound and
(2) an organic oxygen containing titanium compound and
(b) a mixture comprising a metal compound having the formula $MeR_nX_{3-n}$ in which X is a halogenide, Me is a metal of Group III of Mendeleev's Periodic System of Chemical Elements, R is a hydrocarbon radical containing 1-10 carbon atoms and $0 \leq n < 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower than 1:1 and
(c) a compound containing zirconium and/or hafnium and
II. an organo aluminum compound having the formula $AlR_3$ in which R is a hydrocarbon radical containing 1-10 carbon atoms.

According to a preferred embodiment of the invention the catalyst is used in a process for the polymerisation of ethylene.

The present invention is also directed to a process for the production of polyethylene characterised in that the polymerisation takes place in the presence of a catalyst system comprising
I. a solid reaction product obtained by reaction of:
(a) a hydrocarbon solution comprising
(1) an organic oxygen containing magnesium compound and
(2) an organic oxygen containing titanium compound and
(3) at least one compound containing zirconium and/or hafnium compounds and
(b) a mixture comprising a metal compound having the formula
$MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n < 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower than 1:1 and
II. an organo aluminum compound having the formula $AlR_3$ in which R is a hydrocarbon radical containing 1-10 carbon atoms.

Preferably the compound containing zirconium and/or hafnium compounds is a compound selected from the group of organic oxygen containing zirconium and/or hafnium compounds.

According to a preferred embodiment the metal compound is an aluminum compound having the formula $AlR_nX_{3-n}$ in which X is a halogenide and R is a hydrocarbon radical containing 1-10 carbon atoms and $0 \leq n \leq 3$.

According to a further preferred embodiment of the invention the process takes place in the presence of a catalyst system comprising I. a solid reaction product obtained by reaction of:
(a) a hydrocarbon solution comprising
(1) an organic oxygen containing magnesium compound and
(2) an organic oxygen containing titanium compound and
(3) at least one compound selected from the group of organic oxygen containing zirconium and/or hafnium compounds and
(b) a mixture comprising a metal compound having the formula
$MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n < 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower than 1:1 and
(c) post treatment of the obtained solid reaction product with an aluminum compound having the formula $AlR_nCl_{3-n}$ wherein R is a hydrocarbon radical containing 1-10 carbon atoms and $0 < n \leq 3$ and II. an organo aluminum compound having the formula $AlR_3$ in which R is a hydrocarbon radical containing 1-10 carbon atoms.

According to a preferred embodiment the metal compound from (b) is an aluminum compound having the formula $AlR_nX_{3-n}$ in which X is a halogenide and R is a hydrocarbon radical containing 1-10 carbon atoms and $0 \leq n \leq 3$.

The process results in polyethylene having the required properties and a high bulk density. The process is very suitable for the production of UHMWPE.

Besides UHMWPE also high density polyethylene and linear low density polyethylene may be produced with the catalyst according to the invention. The obtained particle morphology is excellent, which will be beneficial to all particle forming polymerization processes.

According to a preferred embodiment of the invention the process for the production of ethylene with the catalyst according to the invention is directed to the production of UHMWPE.

Generally the bulk density of the UHMWPE powder ranges between 350 kg/m$^3$ and 600 kg/m$^3$ and ranges preferably between 350 kg/m$^3$ and 550 kg/m$^3$ The poured bulk density of the UHMWPE polymer powder is determined by measuring the bulk density of the polymer powder according to the procedure outlined in ASTM D1895/A.

The ultra high molecular weight ethylene homo polymer and/or co polymer obtained with the catalyst according to the present invention is a powder having the following characteristics:
an average molecular weight higher than 280000 g/mol and lower than 10000000 g/mol
an average particle size ($D_{50}$) in the range between 50 and 250 micrometer and
a bulk density in the range between 350 and 600 kg/m$^3$ The polymerization reaction may be performed in the gas phase or in bulk in the absence of an organic solvent, or carried out in liquid slurry in the presence of an organic diluent. The polymerization can be carried out batch wise or in a continuous mode. These reactions are performed in the absence of oxygen, water, or any other compounds that may act as a catalyst poison. Suitable solvents include for example alkanes and cycloalkanes such as for example propane, isobutane, pentane, hexane, heptane, n-octane, iso-octane, cyclohexane, and methylcyclohexane and alkylaromatics such as for example toluene, xylene, ethylbenzene, isopropylbenzene, ethyltoluene, n-propylbenzene and diethylbenzene. The polymerization temperature may range between 20 and 200° C. and preferably between 20 and 120° C. The pressure of a monomer during polymerization is adequately the atmospheric pressure and more preferably 2-40 bars. (1 bar=100000 Pa).

The polymerization may be carried out in the presence of external donors in order to further modify the catalyst performance if this is desired. Suitable external donors are for example organic compounds containing hetero atoms which have at least one lone pair of electrons available for coordination to the catalyst components or aluminum alkyls. Examples of suitable external donors include alcohols, ethers, esters, silanes and amines. The polymerization can be carried out in the presence of an anti-static agent or anti fouling agent in an amount ranging between for example 1 and 500 ppm related to the total amount of reactor contents.

The molecular mass of the polymer can be controlled by any means as known in the art, such as for example by adjustment of the polymerization temperature or by the addition of molecular weight control agents for example hydrogen or zinc alkyls. Due to the very high molecular weight of UHMWPE, it is difficult to analyze its molar mass by for instance Gel Permeation Chromatography (GPC) or Size Exclusion Chromatography (SEC). Hence it is common to measure the viscosity of a dilute solution of UHMWPE, for instance in decalin at 135° C. This viscosity value can subsequently be translated to the molecular weight value.

UHMWPE can be applied in very different areas where excellent impact strength and abrasive wear resistance are required. In medical applications UHMWPE is used in knee, shoulder and hip implants, high strength fibres made from UHMWPE can be found in ballistic cloth, fishing lines and nets and in the mining industry. UHMWPE may be used as hopper or bunker liners.

EP 86481 A discloses a catalyst for olefin polymerisation comprising a hydrocarbon insoluble product obtained by reacting a silicon compound, a compound of a transition metal of groups IVa, Va and VI a to form a reaction mixture and further reacting the obtained reaction mixture with a halogen containing organomagnesium compound having a magnesium-carbon bond to produce an intermediate product and contacting this intermediate product with an organoaluminum halide to form a hydrocarbon insoluble product. EP 86481 A does not disclose a mixture comprising a metal compound having the formula $MeR_nX_{3-n}$ and a silicon compound. EP 86481 A does not disclose the production of ultra high molecular weight polyethylene.

U.S. Pat. No. 4,226,964 discloses a process for polymerizing an olefin in the presence of a catalyst system combining an organoaluminum compound with a hydrocarbon insoluble solid catalytic component prepared by treating a hydrocarbon solution containing a magnesium compound, a titanium compound and a zirconium compound with an aluminum halide. The titanium compound and the zirconium compound are halogen containing compounds. U.S. Pat. No. 4,226,964 does not disclose a mixture comprising a metal compound having the formula $MeR_nX_{3-n}$ and a silicon compound. U.S. Pat. No. 4,226,964 does not disclose the production of ultra high molecular weight polyethylene.

The invention will be elucidated by means of the following non-restrictive examples.

EXAMPLES

All examples were carried out under a blanket of nitrogen.
The solids content in the catalyst suspension was determined in triple by drying 10 ml of a catalyst suspension under a stream of nitrogen, followed by evacuating for 1 hour and subsequently weighing the obtained amount of dry catalyst.
The average particle size ($D_{50}$) of the catalyst was determined by the so called laser light scattering method in hexanes diluent, using Malvern Mastersizer equipment.
The average particle size and particle size distribution ("span") of the polymer powders were determined by sieve analyses according to DIN53477.
Alternatively, the so called Elongational Stress can be determined according to DIN 53493. This Elongational Stress, sometimes also referred to as "Flow Value", can subsequently be translated into the molecular weight as disclosed for example by J. Berzen et al. in The British Polymer Journal, Vol. 10, December 1978, pp 281-287.

Example I

Preparation of a Hydrocarbon Solution Comprising an Organic Oxygen Containing Magnesium Compound, an Organic Oxygen Containing Titanium Compound and an Organic Oxygen Containing Zirconium Compound 40 grams of granular $Mg(OC_2H_5)_2$, 60 milliliters of $Ti(OC_4H_9)_4$ and 76 milliliters of $Zr(OC_4H_9)_4$ were brought in a 1 liter round bottomed flask equipped with a reflux condenser and stirrer. While gently stirring, the mixture was heated to 180° C. and subsequently stirred for 2.5 hours. During this, a clear liquid was obtained. The mixture was cooled down to 120° C. and subsequently diluted with 593 ml of hexane. Upon addition of the hexane, the mixture cooled further down to 67° C. The mixture was subsequently cooled down to room temperature. The resulting clear solution was stored under nitrogen atmosphere and was used as obtained.

Example II

Preparation of a Catalyst

In a round bottom flask, equipped with a condenser, a stirrer and a dropping 0funnel, 400 ml of hexane were added. To this, 1.73 ml of 50% ethyl aluminium dichloride (EADC) in hexane (8.8 mmol Al) were added followed by 12.9 ml of $SiCl_4$. The mixture was cooled to 0° C. and the stirrer was started at 2000 RPM. Via the dropping funnel, 100 ml of the solution from Example I was added over a period of 2 hours. The slightly coloured suspension was subsequently refluxed for 2 hours, whereupon the mixture turned orange. The suspension was subsequently cooled down to ambient temperature, filtered and washed 3 times with hexane. Finally the solids were taken up in hexane and stored under nitrogen.
Catalyst particle size was 7.4 micrometers.

Example III

Polymerization in the Presence of the Catalysts According to Example II

The polymerization was carried out in a 10 liter autoclave using 5 liter purified hexanes as a diluent. 8 mmols of tri-isobutyl aluminum were added to the 5 liter purified hexanes. The mixture was heated to 75° C. and pressurized with ethylene. Subsequently slurry containing the predetermined amount of a catalyst according to the Example II was dosed. The temperature was maintained at 75° C. and the pressure was kept constant at 4 bar (0.4 Mpa) by feeding ethylene. The reaction was stopped when 1000 grams of ethylene has been supplied to the reactor. Stopping was performed by de-pressurizing and cooling down the reactor. The reactor contents were passed through a filter; the wet polymer powder was collected, subsequently dried, weighed and analyzed.

The catalyst yield was 24.1 kilograms polyethylene per gram of catalyst.
The catalyst activity was 3.9 kilograms polyethylene per gram of catalyst per hour per bar.
The bulk density was 379 kg/m$^3$.
$D_{50}$ was 172 micrometers.
The span was 1.1.
The elongational stress value, indicative for the molecular weight was 0.457 MPa.

Comparative Example A

Preparation of a Hydrocarbon Solution Comprising an Organic Oxygen Containing Magnesium Compound and an Organic Oxygen Containing Titanium Compound 100 grams of granular $Mg(OC_2H_5)_2$ and 150 milliliters of $Ti(OC_4H_9)_4$ were brought in a 2 L round bottomed flask equipped with a reflux condenser and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained.

Comparative Example B

Preparation of the Catalyst without a Zirconium Compound

In a round bottom flask, equipped with a condenser, a stirrer and a dropping funnel, 300 ml of hexane were added. To this, 4.4 mmol ethyl aluminium dichloride (EADC) in hexane were added followed by 4.7 ml of $SiCl_4$ (40 mmol). The stirrer was started at 750 RPM. Via the dropping funnel, a mixture of 75 ml of the solution obtained in Comparative Example A was added during a period of 2 hours. The slightly pink coloured suspension was subsequently refluxed for 2 hours, whereupon the mixture turned red. The suspension was subsequently cooled down to ambient temperature, filtered and washed 3 times with hexane. Finally the solids were taken up in hexane and stored under nitrogen.

Comparative Example C

Polymerization with the Catalyst as Prepared in Comparative Example B

The polymerization was carried according to the procedure as described in Example III. The polymer had an Elongational Stress value of 0.395 Mpa, which is significantly lower compared to the value obtained with the catalyst according to the invention. This means that the molecular weight of the ultra high molecular weight polymer obtained without the zirconium compound is significantly lower.

The invention claimed is:

1. A process for the production of ultra high molecular weight polyethylene comprising polymerizing ethylene in the presence of a catalyst system to produce the ultra high molecular weight polyethylene having an average molecular weight higher than 280,000 g/mol and lower than 10,000,000 g/mol, wherein the catalyst system comprises:
   I. a solid reaction product obtained by reaction of
      (a) a hydrocarbon solution comprising
         (1) an organic oxygen containing magnesium compound;
         (2) an organic oxygen containing titanium compound; and
         (3) a compound containing zirconium and/or hafnium;
      and
      (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n < 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower than 1:1; and
   II. an organo aluminum compound having the formula $AlR_3$ in which R is a hydrocarbon radical containing 1-10 carbon atoms.

2. The process according to claim 1, further comprising
   (c) post treatment of the obtained solid reaction product with an aluminum compound having the formula $AlR_nCl_{3-n}$ wherein R is a hydrocarbon radical containing 1-10 carbon atoms and $0 \leq n < 3$.

3. The process according to claim 1, wherein the metal compound having the formula $MeR_nX_{3-n}$ is an aluminum compound having the formula $AlR_nX_{3-n}$ wherein X is a halogenide and R is a hydrocarbon radical containing 1-10 carbon atoms.

4. The process according to claim 1, wherein the organic oxygen containing magnesium compound is a magnesium alkoxide.

5. The process according to claim 1, wherein the magnesium alkoxide is magnesium ethoxide.

6. The process according to claim 1, wherein the organic oxygen containing titanium compound is a titanium alkoxide.

7. The process according to claim 1, wherein the zirconium compound is a zirconium alkoxide.

8. The process according to claim 1, wherein the hafnium compound is a hafnium alkoxide.

9. The process according to claim 1, wherein the compound containing zirconium and/or hafnium is selected from the group of organic oxygen containing zirconium and/or hafnium compounds.

10. The process according to claim 1, wherein the ultra high molecular weight polyethylene has an average particle size ($D_{50}$) in the range between 50 and 250 micrometer.

11. The process according to claim 1, wherein the ultra high molecular weight polyethylene has a bulk density in the range between 350 and 600 kg/m$^3$.

* * * * *